(12) United States Patent
Leighton (10) Patent No.: US 6,557,766 B1
(45) Date of Patent: May 6, 2003

(54) HOT LAMINATION METHOD FOR A HYBRID RADIO FREQUENCY OPTICAL MEMORY CARD CONVERTING SHEETS INTO A WEB PROCESS

(76) Inventor: Keith R. Leighton, 2817 Fulmer Rd., Lorain, OH (US) 44053

( * ) Notice: Subject to any disclaimer, the term of this patent is extended or adjusted under 35 U.S.C. 154(b) by 110 days.

(21) Appl. No.: 09/677,501

(22) Filed: Oct. 2, 2000

Related U.S. Application Data (60) Provisional application No. 60/157,054, filed on Oct. 1, 1999, and provisional application No. 60/218,456, filed on Jul. 14, 2000.

(51) Int. Cl.[7] ............................................. G06K 19/02
(52) U.S. Cl. ....................................... 235/488; 235/492
(58) Field of Search ............................... 235/487, 488, 235/492, 380; 156/298, 300, 311

(56) References Cited

U.S. PATENT DOCUMENTS

| | | | | |
|---|---|---|---|---|
| 4,587,413 A | * | 5/1986 | Hoppe et al. | 235/492 |
| 4,788,102 A | * | 11/1988 | Koning et al. | 428/40 |
| 5,244,840 A | * | 9/1993 | Kodai et al. | 235/492 |
| 5,598,032 A | * | 1/1997 | Fidalgo | 235/492 |
| 5,852,289 A | * | 12/1998 | Masahiko | 235/492 |
| 6,305,609 B1 | * | 10/2001 | Melzer et al. | 235/487 |

* cited by examiner

Primary Examiner—Daniel St. Cyr
(74) Attorney, Agent, or Firm—Hahn Loeser & Parks LLP (57) ABSTRACT

A hybrid plastic card, such as a radio frequency identification card, including at least one electronic element embedded therein and a hot lamination process for the manufacture of radio frequency cards and other cards including a micro chip embedded therein. This card has an application on the surface of security overlaminate and a laser photo optical memory strip with the CD-ROM disk technology. The process results in a card having an overall thickness in the range of 0.028 inches–0.033 inches with a surface suitable for receiving dye sublimation printing—the variation in card thickness across the surface is less than 0.0005 inches. A card manufactured in accordance with the present invention also complies with all industry standards and specifications. Also, the hot lamination process of the present invention results in an aesthetically pleasing card. The invention formed in accordance with a hot lamination process and the continuation of the present invention.

20 Claims, 10 Drawing Sheets

HOT LAMINATION METHOD FOR A HYBRID RADIO FREQUENCY OPTICAL MEMORY CARD CONVERTING SHEETS INTO A WEB PROCESS

This application claims the benefit of U.S. Provisional Application Nos.:

| APPLICATION NO. | FILING DATE |
| --- | --- |
| 60/157,054 | 10/01/1999 |
| 60/218,456 | 07/14/2000 |

FIELD OF INVENTION

The present invention relates to combining a radio frequency card and a laser optical memory card that conforms to industry size and performance standards and conventions and that have a superior outer surface to known RFID cards such that card may receive dye sublimation printing and laser optical memory stripe.

BACKGROUND OF THE INVENTION

As the use of plastic cards for credit cards, automated teller machine (ATM) cards, identification cards, and like continues to become more widespread, the problems associated with the use of such cards correspondingly increase. Credit card fraud and identification card fraud are becoming larger problems everyday, and this fraud has introduced uncertainties into our systems of commerce and our security systems. Using easily available technology, criminals are able to manufacture credit/debit cards, ATM cards, identification cards, and the like having another's account code, identification code, or other personal information embedded in the magnetic stripe thereof. Thus, for example, criminals may steal hundreds or thousands of legitimate credit card account numbers and manufacture many additional cards bearing the stolen information. These fraudulent cards are then usable by the criminals to purchase goods and to receive cash with the legitimate card holder and the card issuer left holding the bill. Likewise, so called debit cards are becoming increasingly popular. These cards have stored thereon a certain amount of value for which the card owner has previously paid. For example, a subway rider may purchase a card good for 50 fares, with one fare being deducted from the card each time the owner rides the subway. Criminals have also been able to manipulate the data stored on these cards to defraud the merchants and others.

The ease in which criminals have been able to manufacture and or manipulate known cards results from the existence of the easily altered magnetic strip storage medium used by known cards. These magnetic stripes are easily programmed and reprogrammed using commonly available technology. Thus, there has been found a need in the plastic card industry to provide a more secure plastic card that is very difficult or impossible to fraudulently manipulate. The most likely solution to the above-noted problems associated with known plastic cards is the RFID card and other cards including computer chips embedded therein rather than, or in addition to, a magnetic stripe. While these RFID cards and like have been found to be successful in preventing or limiting fraud, they are more difficult and expensive to manufacture relative to ordinary magnetic stripe cards. One of the biggest obstacles to the wide spread manufacture and use of RFID cards has been the inability of card manufacturers to manufacture an RFID card that meets all industry standards and specifications, such as those set by the International Standards Organization (ISO), that are sufficiently aesthetically pleasing (wherein the embedded electronics are hidden from view), and that have a sufficiently regular or flat surface such that one or both surfaces of the card may be printed on using the very popular and widespread dye sublimation technology. Known plastic cards with computer chips and like embedded therein are too thick to work in connection with existing card reading machinery (ATM machines, telephones, and like) and have a surface that is too irregular to properly and consistently receive dye sublimation printing. Furthermore, prior attempts to manufacture a sufficiently thin plastic card including a computer chip embedded therein have results of a card with inferior aesthetic qualities such as the ability to see the embedded computer chip through the plastic.

SUMMARY OF THE INVENTION

There are several lamination methods in the plastic card industry, such as:

1. Hot and cold using a platen laminator with controlled hydraulic ram pressure.
2. Hot and cold roll laminators.
3. Lamination using adhesives cured by ultra violet radiation, electron beam radiation, or cold roll on contact adhesive.

SUMMARY OF THE INVENTION

This invention requires a combination of several lamination processes to manufacture a Hybrid/Contactless Smart and Laser Optical Card.

The present invention is therefore directed to a hot lamination method for the manufacture of plastic cards including an electronic computer chip therein. The hot lamination method comprises the steps of providing first and second plastic core sheets, positioning at least one or more electronic elements between the first and second core sheets to thus form a core, and placing the core in a laminator and closing the laminator without applying pressure to the substrates. A heat cycle is applied to the core sheets in the laminator, thus liquefying the sheets and the laminator ram pressure is then increased in combination with the heat. A cooling cycle is then applied to the core in the laminator, preferably with an associated increase in ram pressure, and the core is removed from the laminator. At least one or more surface of the core is then printed on using a printing press or similar printing apparatus to print the cutting marks on the substrate for the purpose of cutting the cards of the finished step and also permit the cutting of the sheets into strips containing one or more of the electronics. At this point of the process the sheets can then be overlaminated with an overlaminate film and placed in a laminator and complete the second lamination process, thus giving a smoothness of 0.0005 inches and a combined card thickness of between 0.028 inches to 0.033 inches. These sheets can then be cut into strips and the strips can be welded together via means of ultrasonic welding, chemical adhesive or hot melt glue, thus forming a continuous web to be used in the process of manufacturing an optical memory cards. This would complete a laminated card prepared for the application of an optical memory stripe.

The present invention provides numerous advantages over known card manufacturing processes, including the formation of a plastic card with electronic elements such as a computer chip embedded therein with a pleasing aesthetic appearance, with a sufficiently smooth and regular surface such as the card may receive a optical memory stripe and dye sublimation printing with sufficient durability and characteristics to comply with all industry specifications and standards.

BRIEF DESCRIPTION OF THE DRAWINGS

FIG. 16. is an illustration applying overlaminate and laser optical memory strip to the continuous web FIG. 17. Illustrates a book comprising the core as it is positioned in the laminator apparatus. The core is illustrated containing a printing on one or more of the surfaces overlaid with overlaminate film on one or both sides of the surfaces of the core. This book is positioned between glossy laminating plates and the plates are positioned between laminating pads. The pads are positioned between laminating trays. The laminating trays are positioned between the platens of the laminator, thus completing the final lamination process to produce a glossy card with a completed card thickness of 0.028 inches to 0.033 inches with a surface smoothness of 0.0005 inches that may receive dye sublimation printing and also an optical memory strip with CD-ROM technology.

DETAILED DESCRIPTION OF THE INVENTION

The present invention relates to a plastic card combining two different technologies (1) at least one electronic element embedded therein and (2) a laser optical memory strip layered on the surface of the card. The present invention also relates to a hot lamination process for the manufacture of plastic cards containing both of these elements and more particularly to a hot lamination process for the manufacture of plastic cards that include an electronic element, such as a computer chip or to the electronic element embedded therein. The electronic element may perform a wide variety of functions and take a wide variety of forms. Also, these cards will have a laser optical memory strip or CD-ROM disk applied to the surface. Such cards will hereinafter be referred to as a hybrid radio frequency identification card (RFID) and laser memory strip card or CD-ROM disk TECHNOLOGY. The present invention also relates to a card formed in accordance with the invention.

Figure 1:
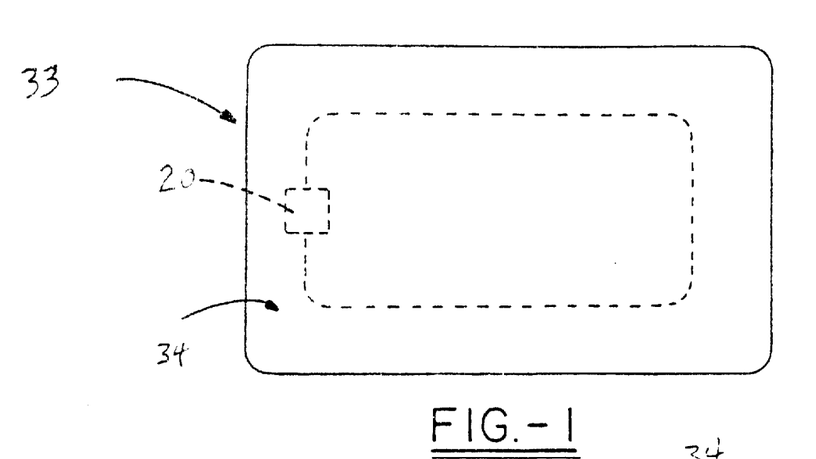
FIG. 1 is a top plan view of a plastic card in accordance with the present invention.

Referring now to FIG. 1, there can be seen a plastic RFID card 33 manufactured in accordance with the present invention and including a electronic element 20 embedded therein.

Figure 2:
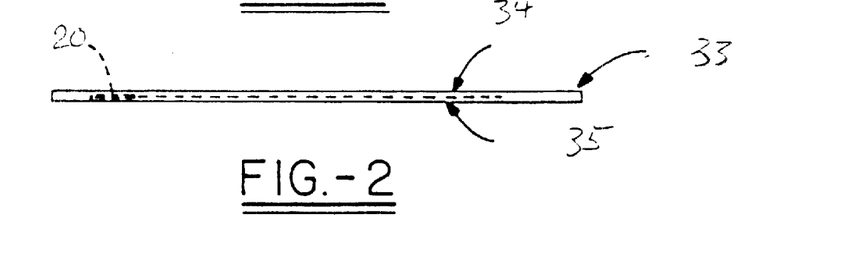
FIG. 2 is a side elevational view of the card shown in FIG. 1.
Figure 3A:
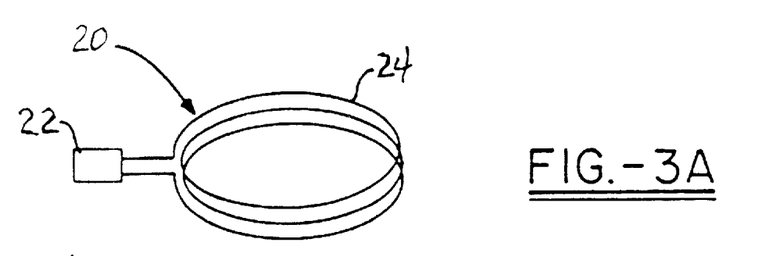
FIGS. 3A–3E are top plan views of various electronic elements that may be embedded in a card in accordance with the present invention.
Figure 3B:
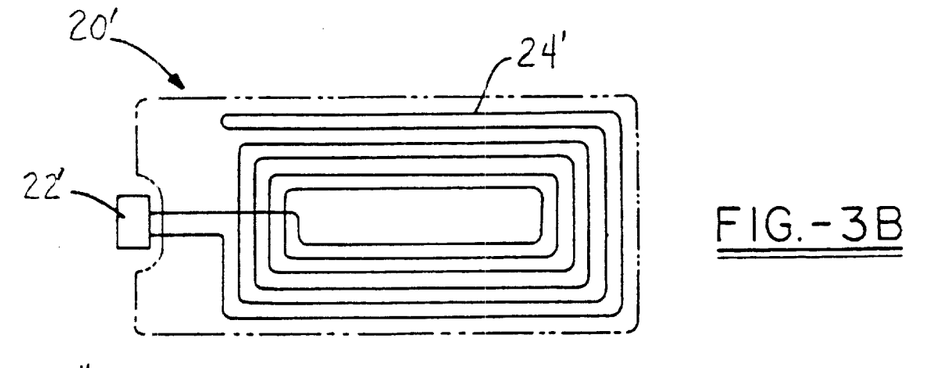
Figure 3C:
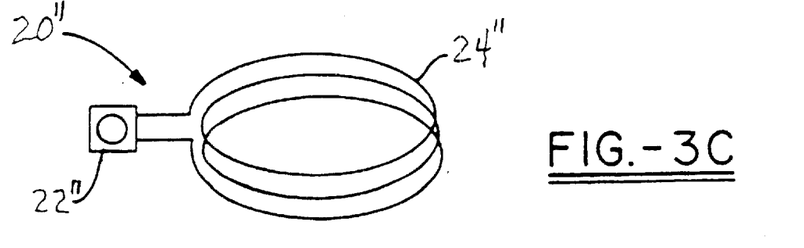
Figure 3D:
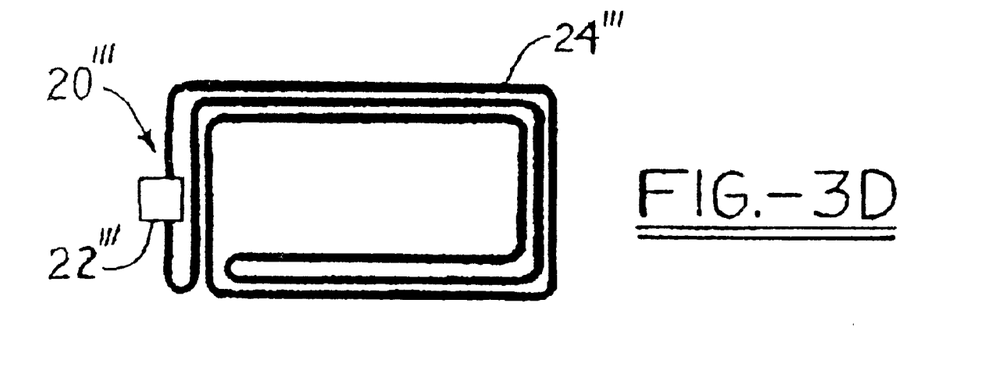
Figure 3E:
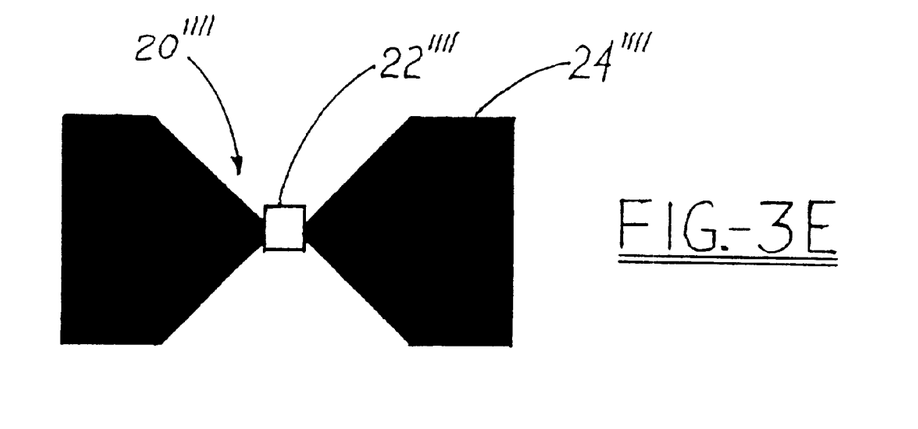
Figure 4:
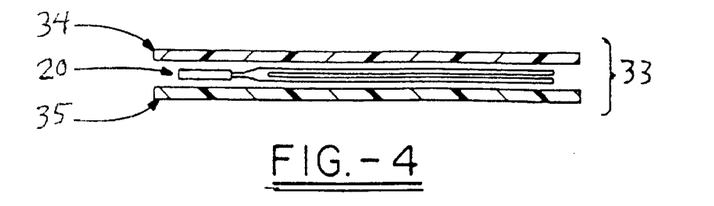
FIG. 4 is an exploded, schematic view of an electronic element position between two plastic core sheets to form a core.
Figure 5:
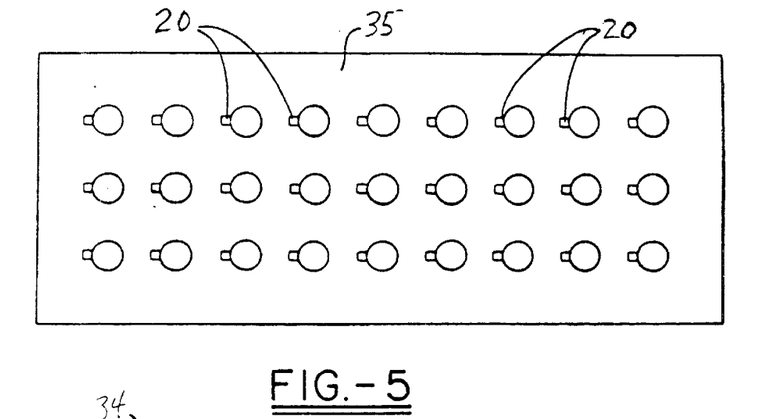
FIG. 5 is a top plan view of a plurality of electronic elements positioned on a sheet of plastic core stock such that they may be covered by a similar sheet of core stock.
Figure 6:
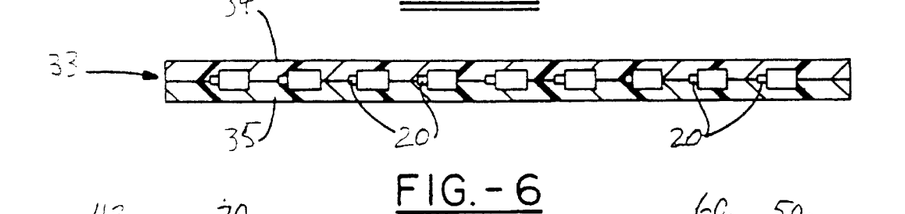
FIG. 6 is a schematic cross-sectional view of one or more electronic elements positioned between sheets of plastic core stock.

Card 33 includes an upper surface 34 and a lower surface 35 as illustrated in FIG. 2. Electronic element 20 may take a wide variety of forms and perform a variety of functions as shown in FIG. 3A–3E respectively, electronic element 20, 20', 20", 20''', 20'''' may be provided by a micro chip 22 including a wire antenna 24 connected thereto, a micro chip 22' and circuit board antenna 24', a read/write micro chip and 22" and a wire coil antenna 24''', or any other suitable electronic element. These electronic elements 20, 20', 20", 20''', 20'''' and other insertions into plastic cards is not new, however, the present invention provides a new hot lamination process for manufacturing plastic cards 33 with these electronic elements 20, 20', 20", 20''', 20'''' embedded therein such that the cards 33 are of a superior quality. Specifically, a card in accordance with the present invention will have a variance in thickness depending on how many different applications will be added such as security, holographic overlaminate films and optical memory strips or CD-ROM disks.

As shown in FIG. 4–10 one or more cards 33 in accordance with the present invention may be manufactured by positioning an electronic element 20 between first and second sheets of card stock 34, 35 to form a core 33. Preferably as shown in FIG. 5–10 a plurality of cards are manufactured simultaneously, in thus, a plurality of electronic elements 20 are positioned between the first and second sheets of plastic core stock 34, 35 (only the second sheet 35 being shown in FIG. 5 for clarity). When a plurality of electronic elements 20 are positioned between first and second sheets of plastic core stock 34, 35, electronic elements 20 are properly positioned relative to one another such that a plurality of cards may be cut from the resulting card stock. Plastic core sheets 34, 35 may be provided by a wide variety of plastics, the preferred being polyvinyl chloride (PVC) having a thickness in the range of 0.006 inches and preferably having a combined thickness of approximately 0.0125 inches. Those skilled in the art will recognize that the thickness of the plastic core electronic elements that are to be embedded there between. Other suitable plastics that may be utilized include polyester, acrylonitrile-butadiene-styrene (ABS), polycarbonate and any other suitable plastic.

Figure 7:
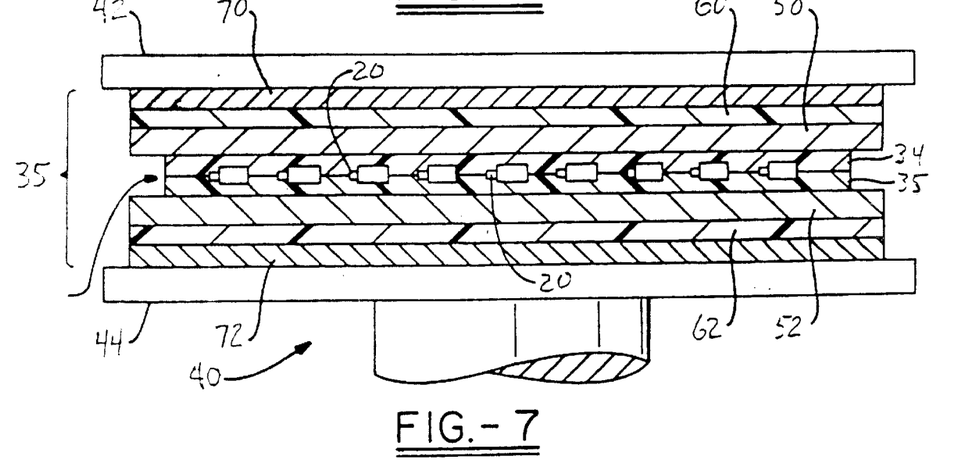
FIG. 7 schematically illustrates a book comprising the core, as it is positioned in a laminator apparatus.

Subsequent to placing one or more electronic elements 20 between the first and second sheets 34, 35 of plastic core stock to form a core 33, this core 33 is placed in a laminator apparatus 40 of the type well known in the art of plastic card manufacturing. As shown in FIG. 7, laminator 40 includes upper and lower platens 42, 44 for applying ram pressure to an article positioned there between. In addition to the ability to apply ram pressure, laminator 40 is preferably of the type having controlled platens 42, 44 that may provide both heat and chill cycles and preferably includes cycle timer to regulate cycle time. Core 33 is positioned between first and second laminating plates 50, 52, one of which is preferably matte finished to provide laminated core 33 with at least one textured outer surface. First and second laminating pads 60, 62 are positioned outside of the laminating plates 50, 52 and first and second steel plates 70, 72 are likewise positioned outside of pads of 60, 62 and the entire assembly forms a book 35 for being positioned in laminator 40 between platens 42, 44.

Once book 35 is positioned in laminator 40 as shown in FIG. 7, the first lamination cycle is initiated by closing laminator platens 42, 44, preferably applying little or no ram pressure to book 35. A laminator heat cycle is initiated, bringing the temperature of platens 42, 44 up to a range of 275° F. to 400° F., and most preferably up to a range of 300° F. to 370° F. for a period of greater than 5 minutes, and preferably in the range of 7 to 10 minutes. Once the heat cycle has been applied to the book 35 as is set forth above, the ram pressure of laminator 40 is increased to facilitate the flow of the plastic core sheets 34, 35 so that the one or more electronic elements 20 are encapsulated thereby, and so that sheets 34, 35 form a uniform core 33 (seen most clearly in FIGS. 8–10) with upper and lower surfaces 34, 35. As mentioned, the use of matte finished laminator plates 50, 52 provides surfaces 34, 35 with a slightly roughened or textured quality which will facilitate the application of a coating thereto as is discussed below. The ram pressure applied during the heat cycle and the length of the heat cycle may vary, depending especially upon the size of sheets 34, 35. For example, the cycle time may be in the range of 10–15 minutes. In one example, a ram pump pressure of 940 pounds per square inch (p.s.i.) was applied for 10–15 minutes to form a uniform core 33, using sheets 34, 35 of a size in the range of 12 inches by 24 inches to 24 inches by 36 inches.

Subsequent to the above heat cycle, laminator 40 applies a chill cycle to book 35 during which time the ram pressure of the laminator 40 is increased, preferably by approximately 25% until the platens 42, 44 have cooled to approximately 40° F. to 65° F. for approximately 10–15 minutes. Core 33 may then be removed from laminator 40 for additional processing.

Figure 8:
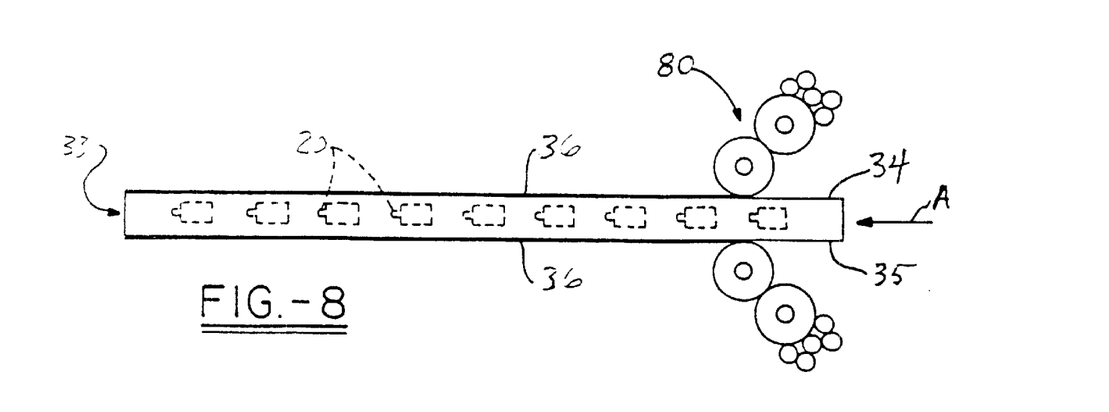
FIG. 8 schematically illustrates the core as it is being printed on after removal from the laminator using a printing press or similar printing apparatus.

Subsequent to the removal of core 33 from laminator 40 and as illustrated in FIG. 8, core 33 is coated on at least one of it's upper and lower surfaces 34, 35 with a layer of printing ink 36. This may be accomplished using a wide variety of printing techniques such as offset printing, letterpress printing, screen printing, roller coating, spray printing, litho-printing, and other suitable printing techniques. As shown in FIG. 8, core 33 is fed in the direction indicated with arrow A through a printing press, a lithographic printer, or a similar apparatus 80. This printing step is performed to coat at least one surface 34, 35 of core 33 with a layer of aesthetically pleasing ink 36. This layer of ink 36 cosmetically hides the one or more electronic elements 20 that are embedded within core 33, and prevents these one or more electronic elements 20 from showing through the relatively thin core 33. In this manner, the one or more electronic elements 20 encapsulated in core 33 are completely hidden from view without requiring the plastic used in the manufacture core 33 to be excessively thick.

Figure 9:
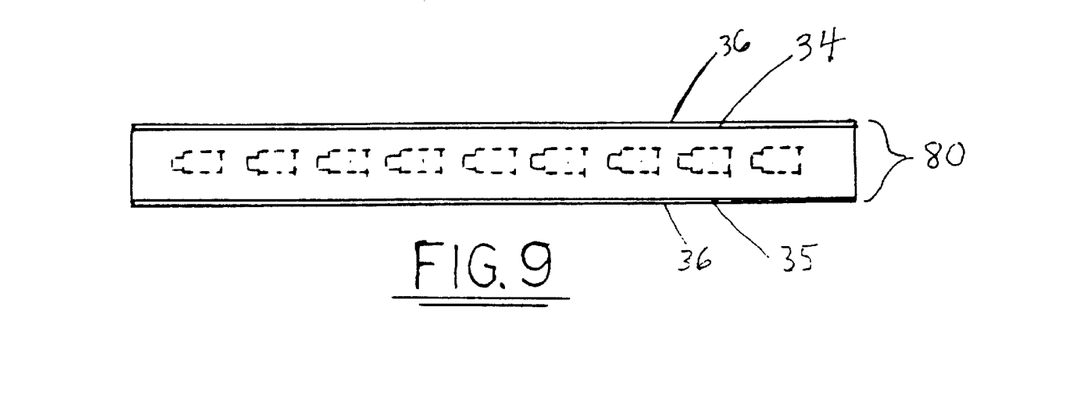
FIG. 9 is a cross sectional view schematically illustrating the application of printing marks for shear optically cutting and optically cutting the individualized cards.
Figure 10:
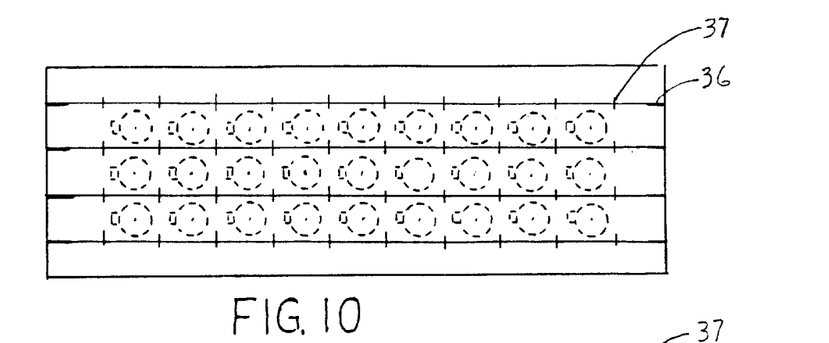
FIG. 10 is a top view of the sheet illustrating hidden electronics within the sheet illustrating printed marks for cutting the sheet into strips and cutting the individual cards from the strips.

Referring now to FIG. 9–10 the drawings illustrate layering of printing on surfaces 34 and 35. As illustrated in FIG. 10 print marks 36 facilitates cutting the sheets into strips as illustrated in FIG. 11.

Figure 11:
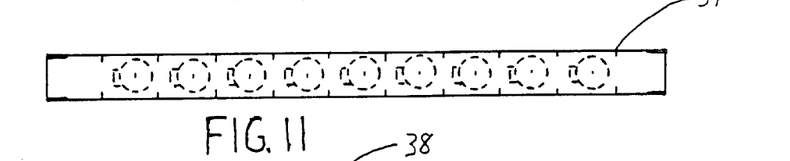
FIG. 11 is an illustration of a strip of hidden electronics in a strip cut from the sheet.

FIG. 11 illustrates a strip cut from the sheet of 33 FIG. 10. the strip illustrates optical trim marks 37. When ends of the strips are trimmed cutting off the ends containing optical trim marks 36 the strip can then be affixed together via means of ultrasonic welding or gluing joining the strips together 38 as illustrated in FIG. 12.

Figure 12:
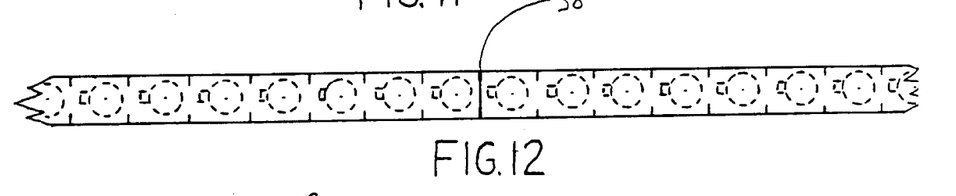
FIG. 12 is an illustration of trimmed strips welded or glued together to form a continuous strip of hidden electronics within the strip illustrating printed optical cutting marks or images.

FIGS. 10, 11 and 12 illustrates sheets made into strips with optical cut marks.

Figure 13:
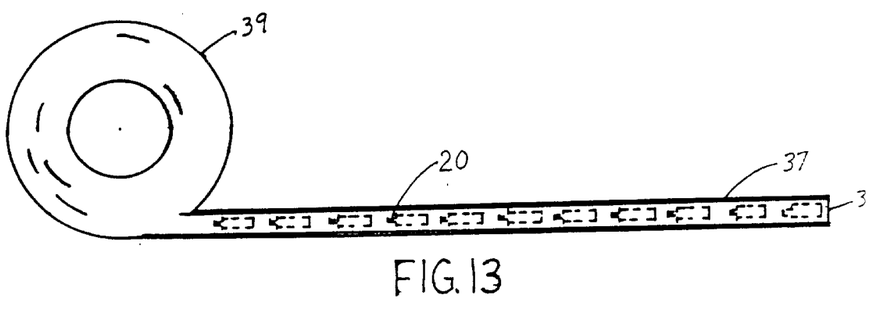
FIG. 13 illustrates a roll of strips glued together to form a continuous web of electronics containing images and optical cut marks. This illustration is the completed web ready for the application of overlay and optical laser receptive strips to complete a hybrid radio frequency and laser optical memory card.

FIG. 13 illustrates a roll 39 of continuous strips affixed together. This roll of continuous strips can then be applied as a substrate in the use of manufacturing laser optical memory cards as using CD-ROM disk technology. This would then produce a hybrid card using two extremely high noncounterfeitable technologies as illustrated in FIG. 14.

Figure 14:
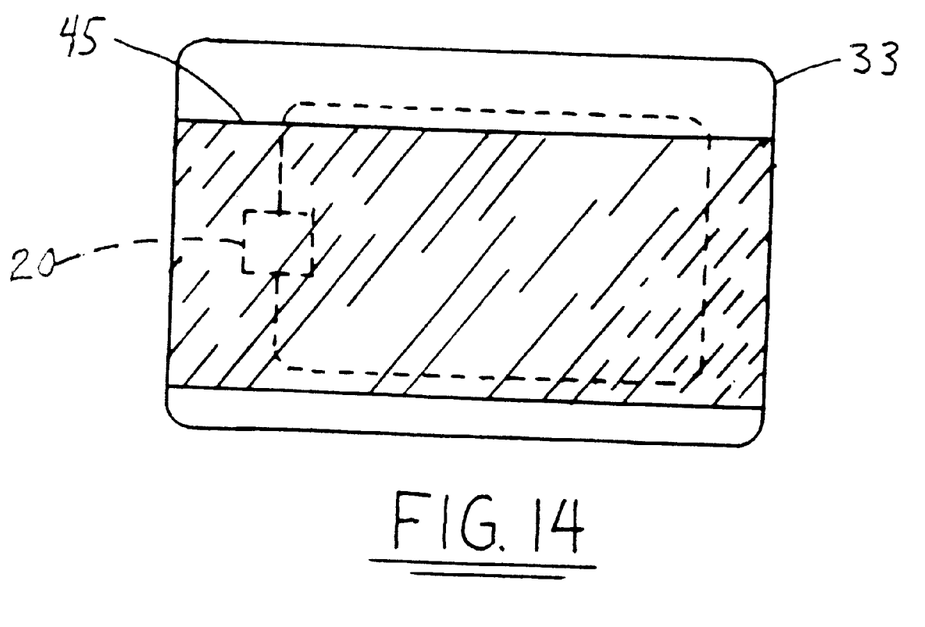
FIG. 14 is an illustration of a top view of a laser optical memory card containing hidden radio frequency electronics.

FIG. 14 illustrates a top view of a single card containing a RFID contactless smart chip and electronics a laser photo optic memory strip 45 with CD-ROM disk technology. This card is then ready for encoding on the optical memory strip and writing into the smart chip 20 and receiving dye sublimation printing and encoding a magnetic strip if used.

Figure 15:
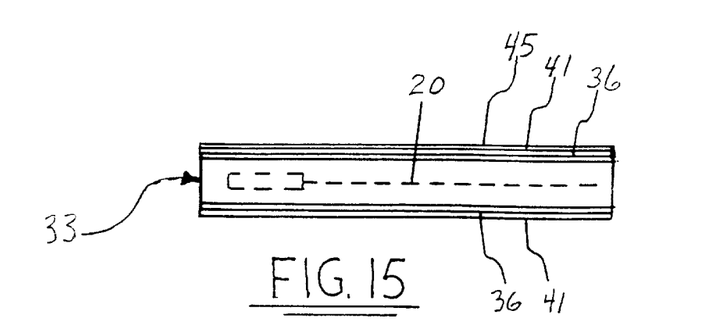
FIG. 15. is an illustration of cross-section view of a laser optical memory card containing radio frequency electronics.

FIG. 15 illustrates a side cross-section of a single card containing a "RFID contactless smart chip and a cross-section of the layering of ink 36 and security overlaminate and laser photo optical memory strip 45 with CD-ROM disk technology. FIG. 15 also illustrates overlaminate film 41, layered over printing 36 of FIG. 9 and FIG. 10.

Figure 16:
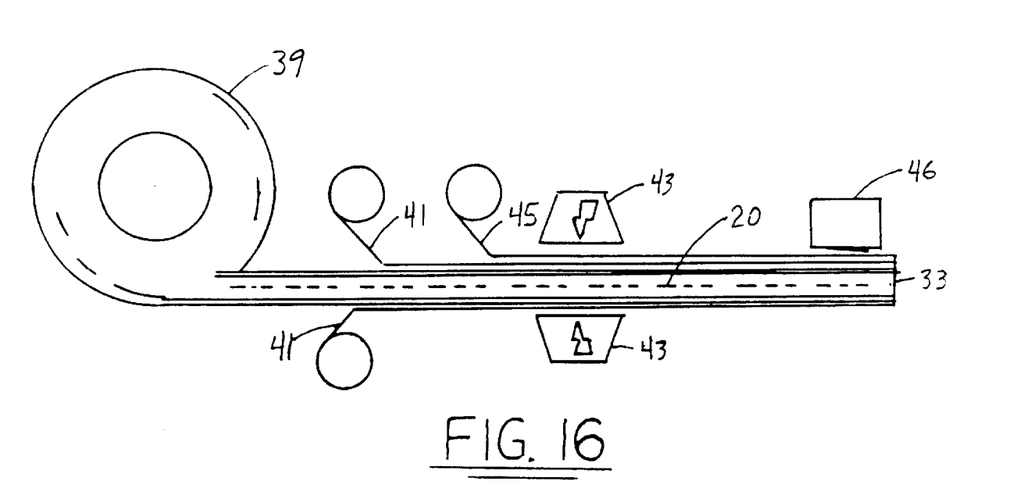

FIG. 16 illustrates a roll of electronics embedded in a core stock 33 printed 36–37 and layered with security holographic overlaminate 41 via electron beam or ultra violet photo adhesive or cold contact glue 43 and layered with a roll strip of laser photo optical memory or CD-ROM disk technology 45. FIG. 16 also illustrates the card 33 being cut from the continuous form of the hybrid cards as illustrated top view of FIG. 14.

Figure 17:
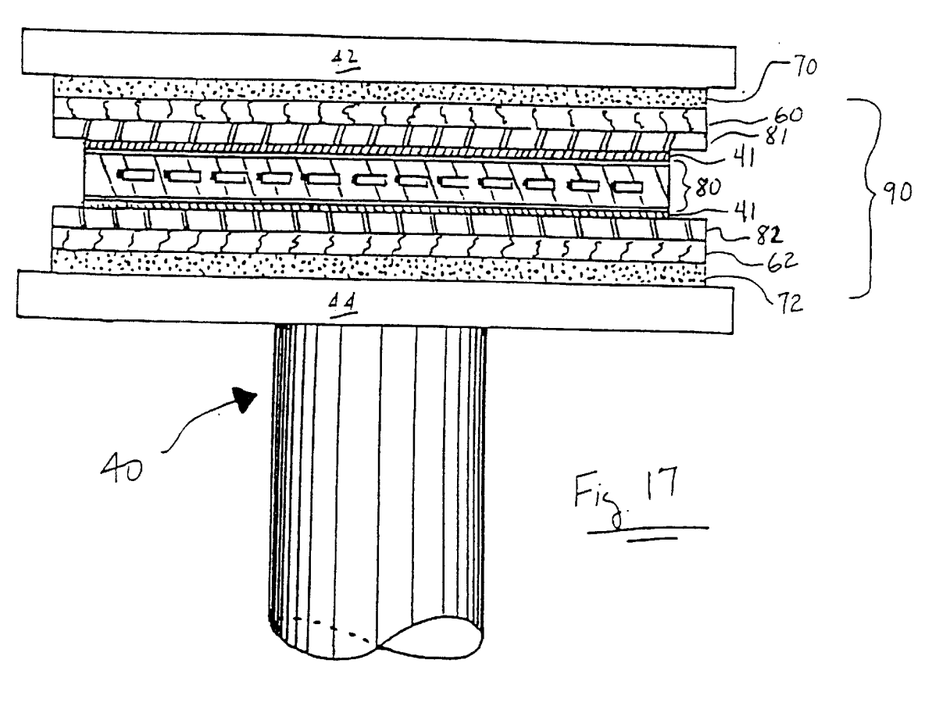

FIG. 17 illustrates 80 of FIG. 9 placed in laminator 40 layered between overlaminate film 41. 41 layered between glossy laminating plates 81 and 82. Laminating plates 81 and 82 are layered between laminating pads 60 and 62. Pads 60 and 62 are layered between trays 70 and 72. FIGS. 72, 62, 82, 41, 81, 60, and 70 makeup a book 90. Book 90 is placed between platens 44, 42 of laminator 40. A normal laminating cycle of FIG. 17 is applied to book 90 with minimal ram pressure of the laminator 40. At the start of the heat cycle approximately 50 pounds PSI increasing to 250 lbs. PSI of pressure through the heat cycle of 285° F.–300° F. At the start of the chill cycle the ram pressure is increased approximately 20% after the chill cycle is complete between 45° F.–65° F. the pressure is released and the book is removed from the laminator.

Figure 18:
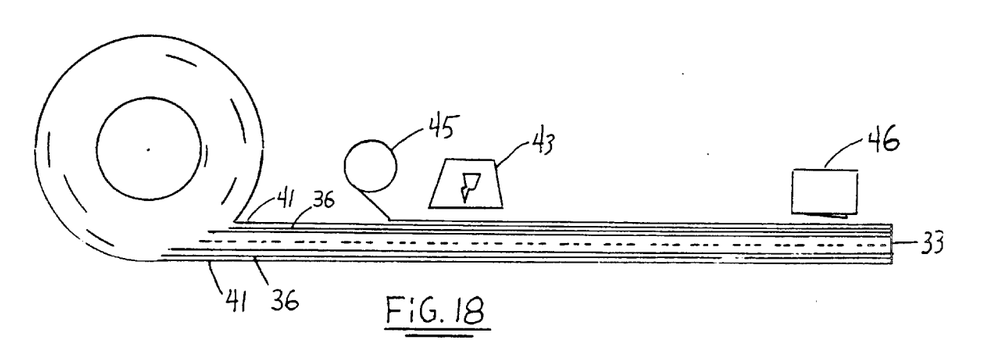
FIG. 18. Illustrates a continuous roll of strips affixed together of overlaminated printed cards containing contactless integrated circuit chips and antennas, being overlayed with optical memory strip with CD-ROM technology and cut out from this continuous roll or form.

FIG. 18 illustrates a roll of laminated cards being overlayed with optical memory strip 45, and cards being cut 46, from a continuous substrate. FIG. 13 illustrates a roll 39 of continuous strips affixed together. This roll of continuous strips can then be applied as a substrate in the use of manufacturing laser optical memory cards as using CD-ROM disk technology. This would then produce a hybrid card using two extremely high noncounterfeitable technologies as illustrated in FIG. 14.

FIG. 14 illustrates a top view of a single card containing a RFID contactless smart chip and electronics a laser photo optic memory strip 45 with CD-ROM disk technology. This card is then ready for encoding on the optical memory strip and writing into the smart chip 20 and receiving dye sublimation printing and encoding a magnetic strip if used.

FIG. 15 illustrates a side cross-section of a single card containing a RFID contactless smart chip and a cross-section of the layering of ink 36 and security overlaminate and laser photo optical memory strip 45 with CD-ROM disk technology.

FIG. 16 illustrates a roll of electronics embedded in a core stock 33 printed 36–37 and layered with security holographic overlaminate 41 via electron beam or ultra violet photo adhesive or cold contact glue 43 and layered with a roll strip of laser photo optical memory or CD-ROM disk technology 45. FIG. 16 also illustrates the card 33 being cut from the continuous form of the hybrid cards as illustrated top view of FIG. 14.

What is claimed is:

1. A hot lamination process with a manufacture of a hybrid plastic card, said process comprising the steps of:
   (a) providing first and second plastic core sheets;
   (b) positioning at least one electronic element between said first and second plastic core sheets to form a layered core;
   (c) positioning said core in a laminator apparatus, heating said core in the laminator, thereafter applying ram pressure to said core such that said at least one electronic element is encapsulated in said core, and thereafter cooling said core in conjunction with laminator ram pressure being applied to said core, said core including upper and lower surfaces;
   (d) printing on at least one of said upper and lower surfaces of said core such that a layer of ink is applied to said at least one upper and lower surface of said core whereby shear cutting marks are applied and also optical single card cutting marks are applied on at least one surface of said core;
   (e) cutting of said core at said printing marks into strips containing RFID electronics;
   (f) cutting shear cutting marks from both ends of said strips of core stock, containing RFID electronics;
   (g) affixing said core strips containing RFID electronics end to end via means of ultrasonic welding, adhesive gluing.

2. The hot lamination process as recited in claim 1, wherein said step (c) positioning said core in a laminator apparatus is carried out by positioning said core between first and second laminating plates, at least one of said first and second laminating plates having a matte finish to provide at least one of said upper and lower core surfaces with a correspondingly textured surface.

3. The hot lamination process as recited in claim 2, wherein each of said first and second laminating plates includes matte finish to provide both of said upper and lower surfaces of said core with a correspondingly textured surface.

4. The hot lamination process as recited in claim 1, wherein said first and second plastic core sheets are made from a material selected from the group consisting of polyvinyl chloride, polyester, and acrylonitrile-butadiene-styrene or polycarbonate wherein each of said sheet has a thickness in the range of 0.006 inches to 0.012 inches.

5. The hot lamination process as recited in claim 4, wherein said first and second plastic core sheets have a combined thickness of approximately 0.0125 inches.

6. The hot lamination process as recited in claim 1, wherein said step (c) is carried out by:
   (c1) constructing a first book including said core and at least first and second laminating plates respectively adjacent to said upper and lower surfaces of said core;
   (c2) positioning said book in said laminator apparatus;
   (c3) closing said laminator apparatus and heating said core for a first predetermined amount of time without applying essentially any laminator ram pressure to said core;
   (c4) increasing said laminator ram pressure following the passage of said first predetermined amount of time to apply pressure to said core in conjunction with said heating of said core; and,
   (c5) cooling said core in said laminator in conjunction with laminator ram pressure being applied to said core.

7. The hot lamination process as recited in claim 6, wherein said step (c5) is carried out with a ram pressure that is greater than the ram pressure utilized in step (c4).

8. The hot lamination process as recited in claim 7, wherein the laminator pressure utilized in step (c5) is at least approximately 25% greater than the ram pressure utilized in step (c4).

9. The hot lamination process as recited in step 6, wherein at least one of said first and second laminating plates is a matte finished laminating plate to provide at least one of said upper and lower surfaces of said core with a corresponding matte finish.

10. The hot lamination process as recited in claim 9, wherein both of said first and second laminating plates are matte finished laminating plates to provide each of said upper and lower surfaces of said core with a corresponding matte finish.

11. The hot lamination process as recited in claim 6, wherein said step (c3) is carried out by heating said core to a temperature in a range of 300° F. to 370° F. for at least 5 to 10 minutes.

12. The hot lamination process as recited in claim 11, wherein said step (c4) is carried out by increasing said laminator ram pressure to a pressure approximately in a range of 700 p.s.i. to 1000 p.s.i. for at least 10 minutes.

13. The hot lamination process as recited in claim 6 wherein said core sheets further include trim marks, and further comprise the step of cutting said core sheets into strips at a location of said trim marks.

14. The hot lamination process of claim 13 comprising the further steps of affixing said strips together via means of ultrasonic welding, gluing to form a continuous form wound onto a roll.

15. The hot lamination process of claim 14 comprising the further steps of: applying a security overlaminated file to said rolled core sheets; applying a laser photo optical memory strip with CD-ROM technology and cutting said rolled core sheets into individual cards.

16. The hot lamination process as recited in claim 1, wherein said step (d) is carried out utilizing a printing press.

17. The hot lamination process as recited in claim 1, wherein said step (d) is carried out utilizing a coating technique selected from a group consisting of silk screen printing, offset printing, letterpress printing, screen printing, roller coating, spray printing, and litho-printing.

18. The hot laminated process as recited in claim 1, wherein the at least one electronic element is a micro chip and an associated wire antenna.

19. The hot lamination process as recited in claim 1, wherein the at least one electronic element is a micro chip and an associated circuit board antenna.

20. The hot lamination process as recited in claim 1, wherein said at least one electronic element is a read write integrated chip and associated antenna.

* * * * *